United States Patent

Marlan et al.

[11] Patent Number: 5,829,012
[45] Date of Patent: Oct. 27, 1998

[54] SYSTEM FOR PROGRAMMABLY PROVIDING MODIFIED READ SIGNALS WITHIN A ROM-BASED MEMORY

[75] Inventors: Gregory Allen Marlan, San Jose, Calif.; Ronald Gene Arnold, Apple Valley; Gerald Gregory Fagerness, Lino Lakes, both of Minn.

[73] Assignee: Unisys Corporation, Blue Bell, Pa.

[21] Appl. No.: 636,759

[22] Filed: Apr. 19, 1996

[51] Int. Cl.$^6$ .............................. G06F 12/02; G06F 13/00
[52] U.S. Cl. ...................... 711/102; 711/101; 711/104; 711/108; 711/202
[58] Field of Search ................ 364/DIG. 1, DIG. 2; 365/230.03; 711/101, 102, 104, 2, 163, 108, 200, 220, 202; 395/286

[56] References Cited

U.S. PATENT DOCUMENTS

| | | | |
|---|---|---|---|
| 4,302,809 | 11/1981 | Drogichen | 711/220 |
| 4,761,763 | 8/1988 | Hicks | 395/286 |
| 4,982,360 | 1/1991 | Johnson et al. | 711/108 |
| 5,007,020 | 4/1991 | Inskeep | 711/200 |
| 5,034,927 | 7/1991 | Kasa | 365/230.03 |
| 5,237,669 | 8/1993 | Spear et al. | 711/2 |
| 5,367,658 | 11/1994 | Spear et al. | 711/163 |

*Primary Examiner*—Tod R. Swann
*Assistant Examiner*—Tuan V. Thai
*Attorney, Agent, or Firm*—Charles A. Johnson; Mark T. Starr; Beth L. McMahon

[57] ABSTRACT

A control store apparatus having flexibility for reprogramming of microcode. A ROM with predetermined microcode is embedded in a microprocessor. A RAM, into which predetermined microcode may be scanned, is also embedded in the microprocessor. An Address RAM stores addresses of the ROM and RAM which are entry points into the microcode. Selection bits are respectively associated with the addresses stored in the Address RAM for selecting between microcode in the ROM and microcode in the RAM. A remapping circuit provides further flexibility. The remapping circuit includes a storage array into which predetermined ROM addresses and respectively associated RAM address may be scanned. The remapping logic circuit is directly coupled to address generation circuitry in the microprocessor for receiving a first part of the ROM address, and is directly coupled to the storage array. The remapping logic circuit is thereby capable of remapping a ROM address to a RAM address efficiently. A second part of the ROM address, which may be generated later than the first part of the ROM address is routed directly to both the ROM and the RAM.

20 Claims, 10 Drawing Sheets

SYSTEM FOR PROGRAMMABLY PROVIDING MODIFIED READ SIGNALS WITHIN A ROM-BASED MEMORY

BACKGROUND

1. Field of the Invention

This invention generally relates to control stores for microprocessors and more particularly to a control store apparatus that utilizes both a Read-Only Memory (ROM) and a Random Access Memory (RAM).

2. Description of the Related Art

The usage of ROMs is popular with logic designers because they are smaller and they consume less power than RAMs. A smaller footprint and less power consumption result in reduced utilization of integrated circuit resources.

A disadvantage with using a ROM is that the ROM data cannot be changed after the desired data has been manufactured into the ROM. Therefore, any data stored in the ROM must be of a static nature. For example, look-up tables whose data are assured to be stable may be implemented using a ROM. Microcode is also often stored in a ROM under the assumption that the microcode has been thoroughly tested.

Microcode developers would generally prefer to use RAMs for storing microcode because even with impeccable microcode test procedures, program bugs may go undetected in the testing phase and survive into production. However, integrated circuit space, performance., and cost considerations often force microcode developers to use ROMs instead of RAMs for storing the microcode. A RAM allows new microcode to be easily loaded to fix microcode bugs, whereas a ROM does not.

U.S. Pat. No. 5,481,713 to Wetmore et al., describes a system in which compiled and assembled operating system software is embedded on a ROM for the purpose of "freeing up" system RAM for use by application programs. Neither the RAM nor the ROM are part of the system's processor, however, both are accessible to the processor via a system bus. The Wetmore system allows software in system ROM to be remapped to system RAM by vectorizing all references to external routines (i.e., subroutine and function calls). As the ROM code is executing and upon encountering a reference to an external routine, the actual entry point will reference a vector table stored in the system RAM and the corresponding entry in the vector table will point to the actual code to be executed (e.g., have a ROM address or have a jump instruction to the system RAM address). Only the entry points for the ROM code are vectorized (the non-entry point ROM code is not vectorized), thereby requiring that code patches be applied at the subroutine and function level.

While the Wetmore approach may be acceptable for deploying and patching operating system software embedded on a system ROM, the approach is not feasible for high-performance applications. For example, Wetmore's processor may very well have microcode embedded in a ROM within the processor for controlling machine instruction fetching and execution. If Wetmore's approach was applied to microcode level programming, processor performance would be seriously degraded by way of excess references to a vector table in an external RAM. Not only is extra time required by having to frequently access the vector table, but extra time is required because of the bus type interface between the processor and the ROM and the RAM.

Therefore, it is an object of the invention to utilize a ROM as a microcode control store, yet to have the ability to fix microcode logic errors and enhance and/or extend the functionality of the microcode without adversely impacting performance.

SUMMARY OF THE INVENTION

The present invention overcomes the shortcomings of the prior art by providing a mechanism in which a ROM and a RAM are used in combination to provide a single address space. The single address space allows errant microcode to be corrected by replacing or adding microcode to the existing microcode. New microcode that is stored in the RAM may jump back into the ROM microcode. The RAM allows functionality of the ROM microcode to be extended and new instructions to be added.

A single microcode address space is comprised of both ROM and a control store RAM, thereby permitting microcode changes and extensions, even for microcode stored in the ROM. Predetermined microcode is stored in a ROM and other predetermined microcode is stored in a control store RAM. Addresses of control entry points into the microcode are stored in a RAM. The entry point addresses have respectively associated selection bits for selecting either microcode read from the ROM or microcode read from the control store RAM. Microprogrammed control is transferable from the control store RAM back to microcode in the ROM, thereby allowing new microcode to be used in combination with the ROM based microcode.

In the exemplary embodiment of the present invention, the microcode implements programmable machine instructions of a data processing system. New machine instructions may be added to the instruction set of the data processing system by storing an additional entry point address in the RAM of addresses which references the control store RAM, and storing microcode for the new instruction in the control store RAM at the entry point address.

The invention further provides for remapping of a ROM to a RAM without incurring any performance degradation in performing any required remapping during runtime. Microcode branch conditions, which are generated late in the micro-instruction execution cycle, are preserved. That is, branch conditions that dictate the address of the next micro-instruction are preserved even if the referenced ROM block of microcode is remapped to a block of RAM microcode.

To accomplish the remapping, a ROM, a RAM, and remapping logic circuitry are embedded within a microprocessor. Prior to runtime operation, microcode patches are loaded into the RAM, and predetermined ROM addresses and RAM addresses corresponding to the patched microcode are stored in an address storage array in the microprocessor. Operationally, the remapping logic circuit receives a generated ROM address, such as from a control logic circuit within the microprocessor. The address storage array is searched for the generated ROM address. If the generated ROM memory address is present, the associated RAM address is provided by the remapping logic circuit to the RAM. Data may then be read from the RAM.

The remapping logic circuit is directly coupled to receive the generated ROM address, and both the ROM and the RAM are directly coupled to the remapping logic circuit to receive the address output from the remapping logic circuit. The direct coupling, rather than a bussed coupling, allows high performance processing, even if ROM data has been patched.

The invention is also suitable for microcode applications where a first part of the generated ROM address is available early in the execution phase of a micro-instruction, and a second part of the generated ROM address is available later in the execution phase. The early generated first part of the ROM address is remapped, if necessary, and the later generated second part of the ROM address bypasses the remapping logic circuit. This eliminates any time delay that may be associated with any required remapping of a ROM address. The time delay of remapping is eliminated by performing any required remapping in parallel with the generation of the second part of the ROM address.

The second part of the ROM address is often the result of conditions that affect the control flow within the microcode. The present invention provides remapping of ROM address to RAM addresses without impacting performance, even where conditions that affect the control flow within the microcode are generated late in the execution of a micro-instruction.

Still other objects and advantages of the present invention will become readily apparent to those skilled in the art from the following detailed description, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded as illustrative in nature, and not as restrictive.

DETAILED DESCRIPTION

Figure 1:
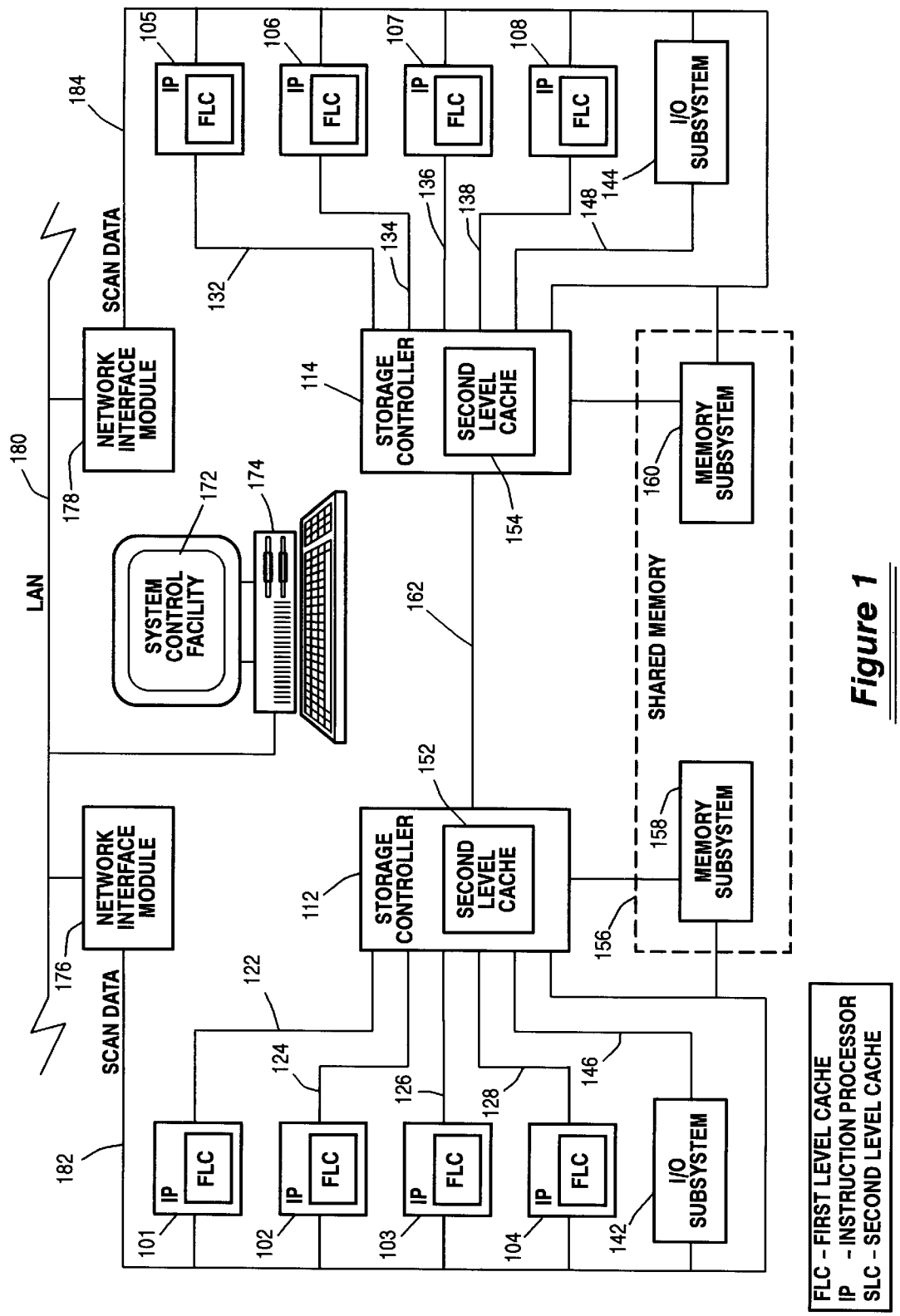
FIG. 1 is a block diagram showing the architecture of a multiprocessor data processing system in which the present invention is embodied.

FIG. 1 is a block diagram showing the architecture of a multiprocessor data processing system in which the present invention is embodied. The system includes eight Instruction Processors, IP 101, IP 102, IP 103, IP 104, IP 105, IP 106, IP 107, and IP 108, each having a dedicated store-through First-Level Cache (FLC).

The system of FIG. 1 has two Storage Controllers 112 and 114. Each of Storage Controllers is coupled to four of the IPs. Lines 122, 124, 126, and 128 illustrate the respective point-to-point couplings between the IP 101, IP 102, IP 103, IP 104 and Storage Controller 112. Lines 122, 124, 126, and 128 represent the collection of control, data, and address lines between the IPs and the Storage Controller. Lines 132, 134, 136, and 138 represent similar couplings between Storage Controller 114 and IP 105, IP 106, IP 107, and IP 108 respectively.

Memory requests can also come from components within the I/O Subsystem 142 and I/O Subsystem 144. I/O Subsystem 142 is coupled to Storage Controller 112 via Line 146, and I/O Subsystem 144 is coupled to Storage Controller 114 via Line 148.

Each of the Storage Controllers 112 and 114 has a respective Second Level Cache (SLC) 152 and 154. The SLCs are global in that each is mapable to the all of system's addressable memory. That is, the entire address range of the addressable memory is cacheable by each of the SLCs. The total available addressable memory is designated by Shared Main Memory 156. The Shared Main Memory is comprised of two Memory Subsystems, Memory Subsystem 158 and Memory Subsystem 160.

Storage Controller 112 is coupled to Storage Controller 114 in a point-to-point fashion as illustrated by Line 162. Line 162 is comprised of data, address, and control lines. SLC 152 may be accessed directly by IP 101, IP 102, IP 103, and IP 104, and indirectly accessed by IP 105, IP 106, IP 107, and IP 108. Similarly, SLC 154 may be accessed directly by IP 105, IP 106, IP 107, and IP 108, and indirectly by IP 101, IP 102, IP 103, and IP 104. If IP 101 issues a read request for an address of Memory Subsystem 160 which is neither in the FLC of IP 101 nor in SLC 152, the request is forwarded to SLC 154. If the requested address is present in SLC 154, the data of the requested address is returned to SLC 152. If the requested address is a miss in SLC 154, the request is forwarded to Memory Subsystem 160. The data is then returned to SLC 152. Note that no replacement of data takes place in SLC 154 as a result of requests from SLC 152.

Storage Controller 112 and SLC 152 are "local" relative to IP 101, IP 102, IP 103, IP 104, and I/O Subsystem 142, and are "remote" relative to IP 105, IP 106, IP 107, IP 108, and I/O Subsystem 144. Similarly Storage Controller 114 and SLC 154 are "local" relative to IP 105, IP 106, IP 107, IP 108, and I/O Subsystem 144, and are "remote " relative to IP 101, IP 102, 1P 103, IP 104, and I/O Subsystem 142. The SLCs may be viewed as dedicated to the requests of their respective local IPs and cooperating in servicing requests from the remote IPs. SLC 152 is dedicated to IP 101, IP 102, IP 103, and IP 104 in that the SLC storage is dedicated to caching data based on requests from IPs 101–104. Similarly, SLC 154 is dedicated to IPs 105–108 in that the SLC storage is dedicated to caching data based on requests from IPs 105–108.

The system of FIG. 1 further includes a System Control Facility (SCF) 172. The System Control Facility includes a collection of programs that are executable on a Microcomputer 174. The SCF provides for system partitioning and resource allocation, system runtime operation, and also maintenance operations. Maintenance operations in this context is the capability to read and write state information (also referred to as "scan data") from and to selected circuits in the functional units of the system.

Figure 2:
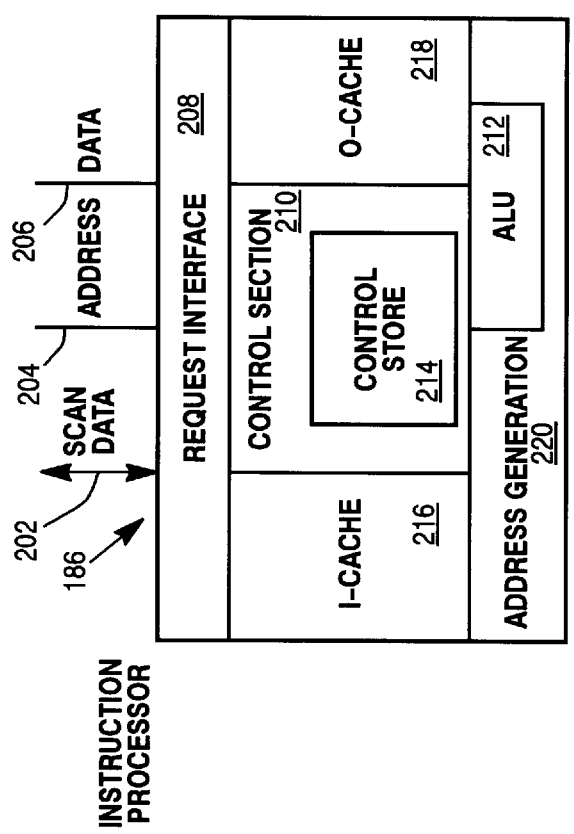
FIG. 2 is a functional block diagram of an Instruction Processor in which the present invention is utilized.

The data processing system includes two Network Interface Modules (NIMs) 176 and 178, each coupled to a Local Area Network (LAN) 180. The SCF 172 is also coupled to the LAN, thereby allowing scan data to be transferred between the SCF and each of the NIMs. The NIMs are in turn respectively coupled to predetermined functional units of the system. The NIM 176 provides a scan data interface to IPs 101–104, I/O Subsystem 142, Storage Controller 112, and Memory Subsystem 158. Similarly, NIM 178 provides a scan data interface to IPs 105–108, I/0 Subsystem 144, Storage Controller 114, and Memory Subsystem 160. Line 182 shows the coupling between NIM 176 and its scannable functional units, and Line 184 shows the coupling between NIM 178 and its scannable functional units. The scannable functional units of the system are initialized by system maintenance operations, performed with the SCF 172 and NIMs 176 and 178, when power is first applied to the system FIG. 2 is a functional block diagram of an Instruction Processor in which the present invention is utilized. The Instruction Processor 186 is exemplary of each of IPs 101–108 of FIG. 1. Scan data to and from the SCF 172 is output and input as shown by Line 202. Address and control signals are routed to the respective Storage Controller 112 or 114 via Line 204. Line 206 represents a set of unidirectional data lines for input and output of data from and to the respective Storage Controller.

The Request Interface 208 coordinates requests initiated from the IP 186 to the respective Storage Controller 112 or 114. Example types of requests from the IP include reading, writing, and locking selected addresses of the Shared Memory 156.

The Control Section 210, along with the Arithmetic Logic Unit (ALU) 212, is the primary section within the IP 186 for executing machine instructions. The Control Section is microcode driven with the microcode being stored in the Control Store 214. Machine instructions fetched from the Instruction Cache 216 or the Shared Memory 156 are decoded in the Control Section and the appropriate microcode from the Control Store is executed. Arithmetic functions are performed by the ALU 212.

The IP 186 includes an Instruction Cache 216 and an Operand Cache 218. The I-Cache 216 includes control and RAM storage for caching machine instructions from the Shared Memory for fast access by the Control Section 210. The O-Cache 218 includes control and RAM storage for caching data elements operated upon by the machine instructions that are executed by the Control Section 210 and ALU 212. The Address Generation section 220 generates address information for fetching the next machine instruction, as well as address information for reading and writing data elements, i.e., operands, as specified by the machine instructions.

Figure 3:
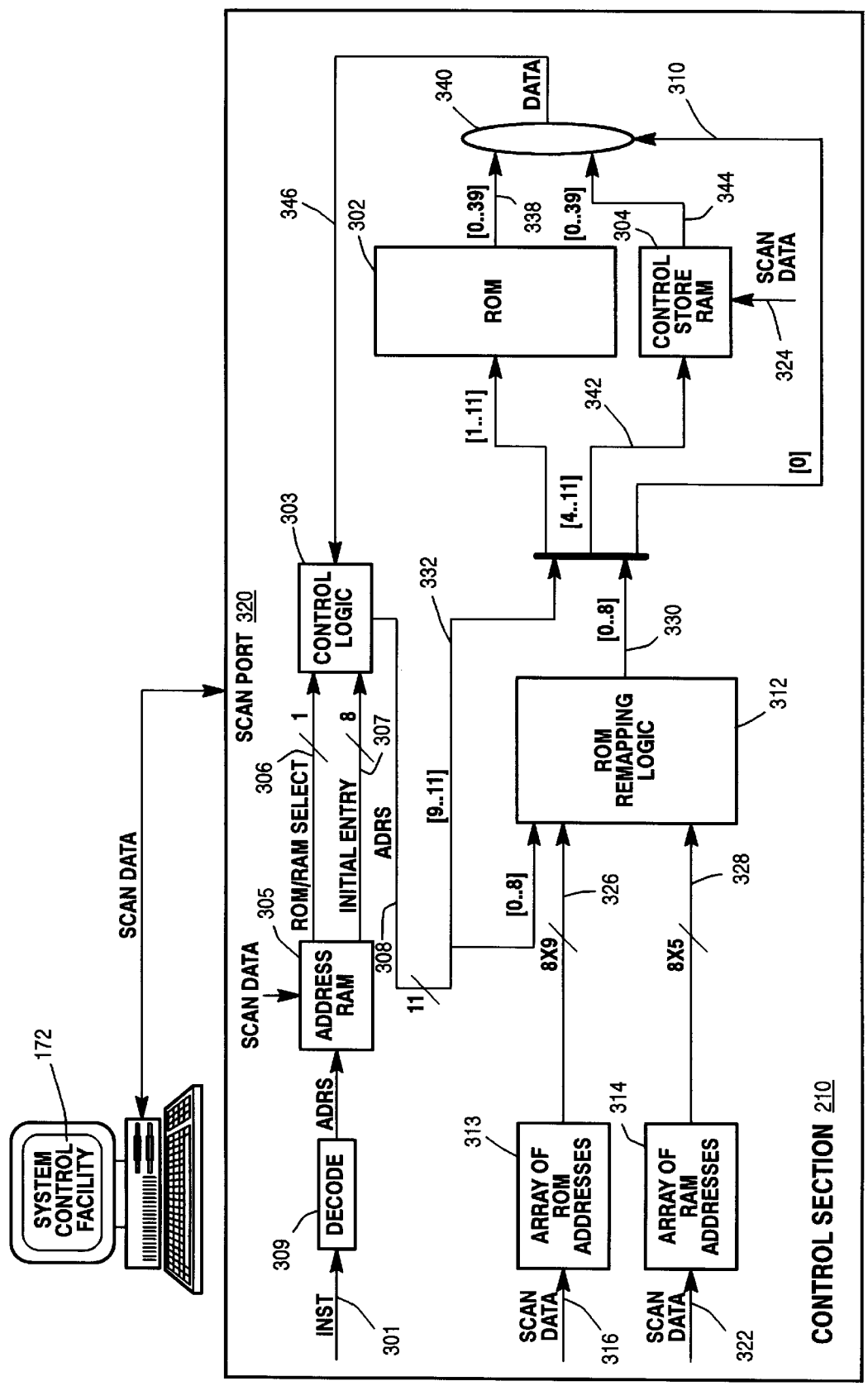
FIG. 3 is a logical block diagram of the circuitry embedded in the Control Section of an Instruction Processor for remapping selected portions of a Read-Only Memory (ROM) to a Random Access Memory (RAM)

FIG. 3 is a logical block diagram of the circuitry embedded in the Control Section of an Instruction Processor for utilizing a ROM in combination with a RAM for storage of microcode. The ROM and the RAM are viewed as a single address space for storage of the microcode. Eight blocks of Control Store RAM 304 are available in the exemplary embodiment, where a block consists of eight micro-instruction words. Those skilled in the art will recognized that the size of the ROM and RAM could vary according to application requirements.

In the exemplary embodiment, the ROM 302 is pre-loaded with micro-instructions which are utilized by the Control Logic 303 in controlling the execution of programmed machine instructions. A set of micro-instructions embody the control mechanism for executing a machine instruction. The micro-instructions of this embodiment are often referred to as microcode or firmware. Other applications of the invention may use the ROM as a data store instead of as a control store. For example, look-up tables may be stored in the ROM instead of micro-instructions.

The Control Store RAM 304 provides storage for microcode. The microcode in the Control Store RAM may correct logic errors in the ROM 302 microcode, extend the functionality of the ROM microcode, or it may replace microcode in the ROM. Two mechanisms are used to access the microcode in the ROM and the microcode in the Control Store RAM. The first mechanism provides direct access to the ROM and to the Control Store. RAM, and the second mechanism involves remapping predetermined ROM addresses to predetermined Control Store RAM addresses.

The mechanism for directly accessing the ROM 302 or the Control Store RAM 304 includes an Address RAM 305 in which are stored predetermined addresses of the ROM and predetermined addresses of the Control Store RAM. Predetermined selection bits are respectively associated with addresses in the Address RAM. A selection bit indicates whether the associated address references the ROM or the Control Store RAM. Line 306 shows the output of the selection bit that is associated with an address output on Line 307. The selection bit and address are input to the Control Logic 303 as an initial control store address for microcode associated with the machine instruction input on Line 301 to the instruction Decode Logic circuit 309. The Decode Logic circuit decodes the machine instruction and outputs an address for reading from the Address RAM 305.

The Control Logic circuit 303 generally initiates the control functions that are specified by the microcode read from the control store ROM 302 and RAM 304. The Control Logic circuit also performs address generation for sequences of micro-instructions. For the initial address provided to the Control Logic 303 by the Address RAM 305, no generation is required.

The selection bit on Line 306 is routed to Selector 340 via Line 310 for selecting between a micro-instruction read from the ROM 302 and a micro-instruction read from the Control Store RAM 304.

The invention provides for control to be transferred from microcode in the Control Store RAM 304 to microcode in the ROM 302. This may be accomplished by establishing a "jump" or "branch" type micro-instruction in the Control Store RAM, where the target address of the jump is a ROM address. A selector bit in the target address designates either the ROM or the Control Store RAM. The selector bit is carried forward as bit [0] of the eleven bit address that is output from the Control Logic 303 on Line 308.

The second mechanism for accessing the microcode in the Control Store RAM 304 involves remapping predetermined addresses of the ROM 302 to predetermined addresses of the Control Store RAM. The remapping logic circuitry is described below.

The Control Logic circuit 303 generates an address for reading data (the data in this embodiment is a micro-instruction) from the ROM 302. Eleven bits of address signals are output on Line 308. The nine most-significant bits (designated as [0..8]) are routed to the ROM Remapping Logic circuit 312, and the three least-significant bits (designated as [9..11]) bypass the ROM Remapping Logic circuit. It should be noted that the three least-significant bits [9..11] are generated late in the micro-instruction processing cycle of Control Logic 303, whereas the nine most-significant bits [0..8] are generated early in the cycle. This allows any necessary remapping to be performed in parallel with generation of the three least-significant bits. Note that the three least-significant bits are branch bits that are generated as a result of branch conditions which are evaluated late in the micro-instruction cycle. The three branch bits provide for 8-way branching within the microcode; that is, the branch bits specify an offset (0–7) from bits [0..8] of the generated ROM address.

The ROM Remapping Logic circuit 312 receives as inputs: addresses of the ROM 302 designated as being remapped, and addresses of the RAM 304 to which the ROM addresses are remapped. An Array of ROM Addresses 313 contains the ROM addresses designated as being remapped, and an Array of RAM Addresses 314 contains the RAM addresses to which the ROM addresses are remapped. The Array of ROM addresses contains eight registers having nine bits each, and the Array of RAM Addresses contains eight registers of five bits each. Only bits [4..8] are replaced in the exemplary embodiment. The content of the registers of the Array of ROM Addresses 313 is provided by scan data on input Line 316. The scan data is provided to the Instruction Processor 186 as input to Scan Port 320 from the System Control Facility 172. In the illustrated embodiment, microcode patches are applied by scanning the appropriate ROM address into the Array of ROM Addresses, scanning a RAM address into a register in the Array of RAM Addresses (as shown by input Line 322), and scanning new microcode into the proper location in the RAM 304 as shown by scan data input Line 324.

The ROM Remapping Logic circuit 312 compares the generated address from the At Control Logic circuit 303 to the addresses stored in the Array of ROM Addresses 313. Input Line 326 represents the eight addresses of nine bits each being input to the ROM Remapping Logic from the Array of ROM Addresses. Input Line 328 represents the eight replacement addresses of five bits each being input to the ROM Remapping Logic. If the ROM Remapping Logic finds that the generated ROM address from the Control Logic 303 is the same as one of the addresses from the Array of ROM Addresses 313, the generated ROM address is replaced with a RAM address from the Array of RAM Addresses 314. Specifically, bits [4..8] from the ROM address are replaced with the five bits of the RAM array. Note that not all of the ROM bits need to be remapped because the RAM is smaller than the ROM and therefore needs fewer address bits. The ROM Remapping Logic outputs nine address bits designated as [0..8] on Line 330.

At approximately the same time that the ROM Remapping Logic has completed any necessary remapping of bits [0..8] of the ROM address, the branch bits [9..11] of the ROM address are made available from the Control Logic 303 on Line 332. Selected ones of the combination of bits [0..8] from the ROM Remapping Logic 312 and the branch bits [9..11] from the Control Logic 303 are routed to the ROM 302 and to the RAM 304.

Bits [1..11] of the address are routed to the ROM 302. Reading from RAM 304 takes place in parallel with reading from the ROM 302. Bits [4..8] from the ROM Remapping Logic and branch bits [9..11] from the Control Logic 303 are input as an address on Line 342. Forty bits of data are output from the RAM on Line 344 to Selector 340.

Bit [0] is generated by the ROM Remapping Logic and is used at Selector 340 to select between data read from the ROM 302 and data read from the RAM 304. Data from the RAM is selected if the ROM address was remapped to a RAM address by the ROM Remapping Logic 312. The selected data is returned to the Control Logic 303 via Line 346.

The Control Section 210 is initialized by system maintenance operations, performed with the SCF 172 and NIMs 176 and 178, when power is first applied to the system shown in FIG. 1. The Array of ROM addresses 313, the Array of RAM addresses 314, the Address RAM 305, and the Control Store RAM 304 are initialized through a single serial scan interface to the ASIC. At power on time, the appropriate hardware access files that reside on SCFs hard disk are transferred to the NIM. These files are serially scanned into RAM and both address arrays by the NIM. After power up initialization of the system is complete, the operating system is started.

Figure 4:
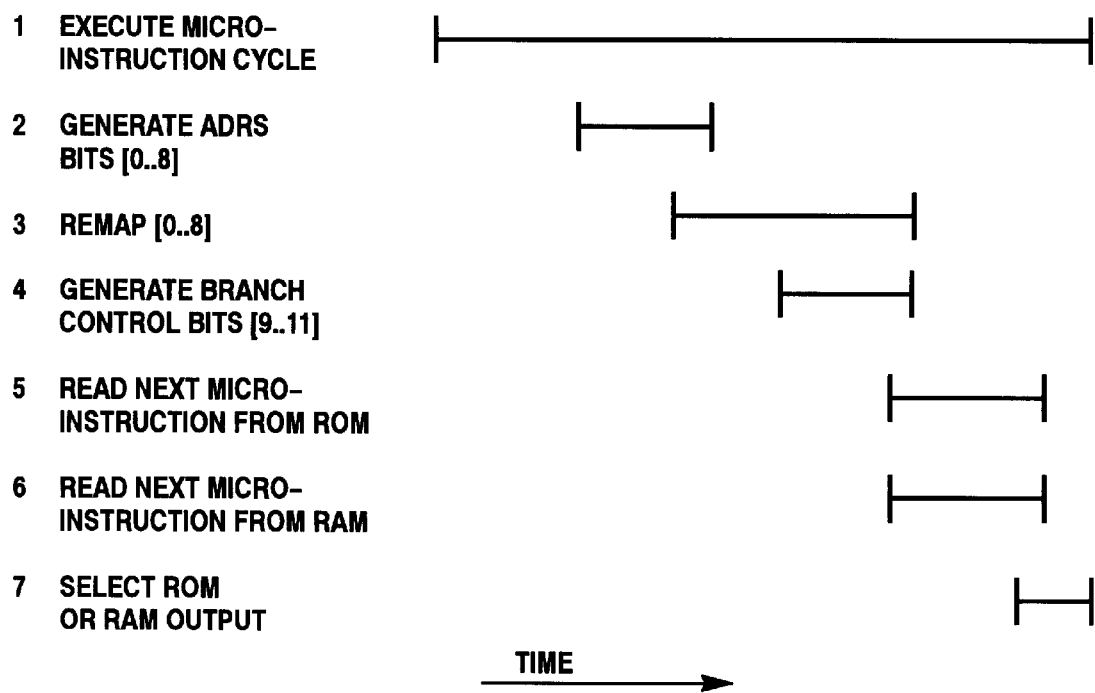
FIG. 4 is a timing diagram that illustrates the operation of the present invention within the exemplary embodiment of executing a micro-instruction.

FIG. 4 is a timing diagram that illustrates the operation of the present invention within the exemplary embodiment of executing a micro-instruction. The objective of FIG. 4 is to show the timing relationships between execution of a micro-instruction and reading the next micro-instruction from the ROM 302 or the RAM 304.

Line 1 illustrates the duration of a cycle for executing a micro-instruction. Early in the cycle, bits [0..8] of the address of the next instruction are generated as shown by Line 2. The ROM Remapping Logic 312 remaps bits [0..8] during the interval shown on Line 3. Line 4 illustrates that later in the execute cycle, bits [9..11] of the address of the next instruction are generated by the Control Logic 303. When all of bits [0..11] of the micro-instruction address are available, the address is supplied to both the ROM 302 and the RAM 304 for reading the next micro-instruction. The Selector 340 selects between the data read from the RAM 304 and the data read from the ROM as shown by Line 7.

Figure 5:
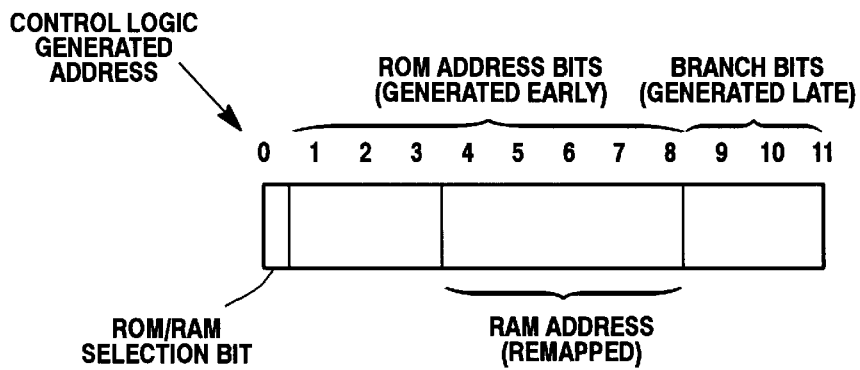
FIG. 5 shows the layout of the generated micro-instruction address from the Control Logic and the ROM Remapping Logic.

FIG. 5 shows the layout of the generated micro-instruction address from the Control Logic 303 and the ROM Remapping Logic 312. The address consists of 11 bits. Bit 0 is used by Selector 340 to select between a micro-instruction read from RAM 304 and a micro-instruction read from ROM 302. Bits [1..8] are generated by the Control Logic 303 early in the execution cycle of a micro-instruction. This is also illustrated as Line 2 in FIG. 4. Branch bits [9..11] are generated late in the execution cycle. Finally, bits [4..8] are replaced with a RAM address if the ROM address bits [1..8] are designated as remapped.

Figure 6:
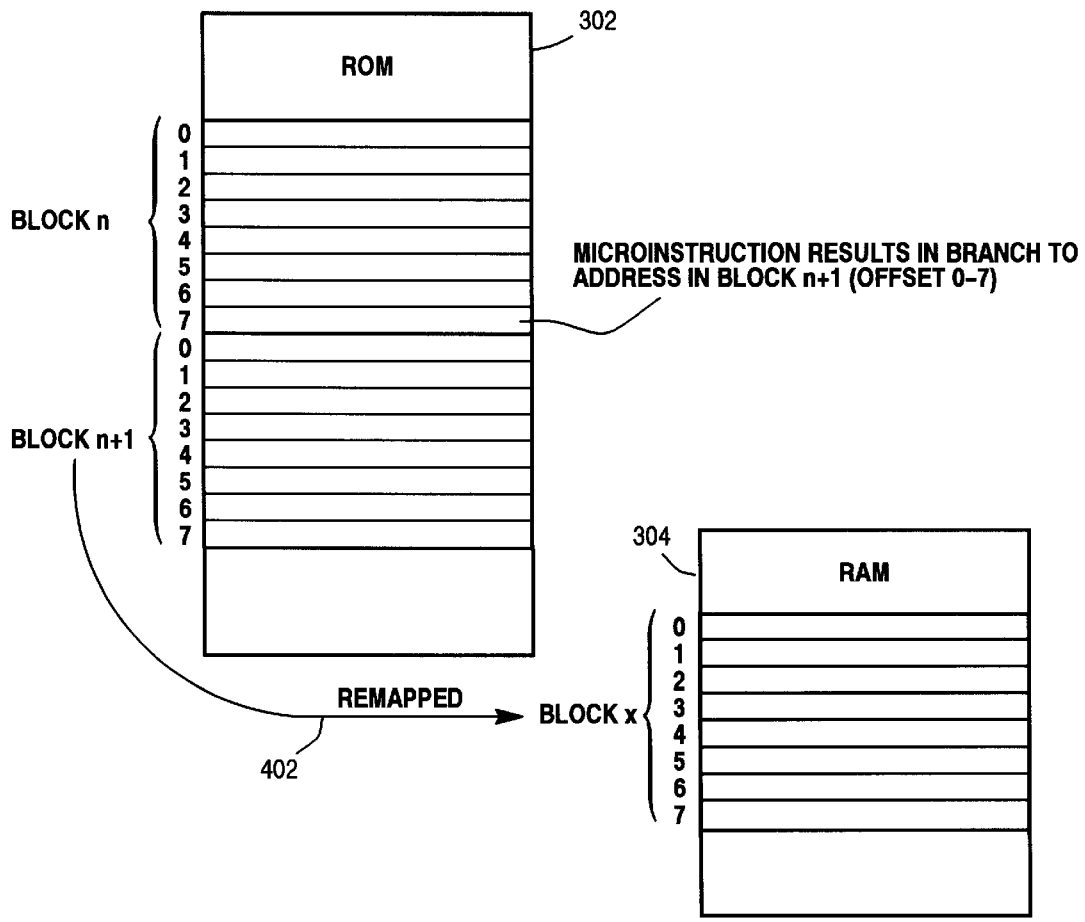
FIG. 6 is a block diagram that further illustrates that remapping of a ROM address to a RAM address.

FIG. 6 is a block diagram that further illustrates that remapping of a ROM address to a RAM address. The addresses in the ROM are grouped into Blocks, where each Block contains 8 micro-instructions. In the FIG., the micro-instructions in each block are referenced as 0–7.

If, for example, Block n+1 of the ROM 302 is remapped to Block x of the RAM 304, as shown by Line 402, the eight bits that address Block n+1 of the ROM are stored in one register of the Array of ROM Addresses 313 during maintenance operations. Correspondingly, the five bits that address Block x of the RAM 304 are stored in one register in the Array of RAM Addresses 314 during maintenance operations.

Continuing with the example, execution of micro-instruction 7 of Block n may result in a branch to any of micro-instructions 0–7 within Block n+1. Remapping of Block n+1 of ROM to Block x of RAM may occur in parallel with micro-instruction execution because bits [1..8] of the micro-instruction address are generated early in the execute cycle. The branch bits [9..11] are effective for ROM addresses that are not remapped as well as for ROM addresses that have been remapped to the RAM 304. The present invention thereby preserves the 8-way branching capability without incurring a time delay in having to wait for completion of generation of the branch bits [9..11].

Figure 7:
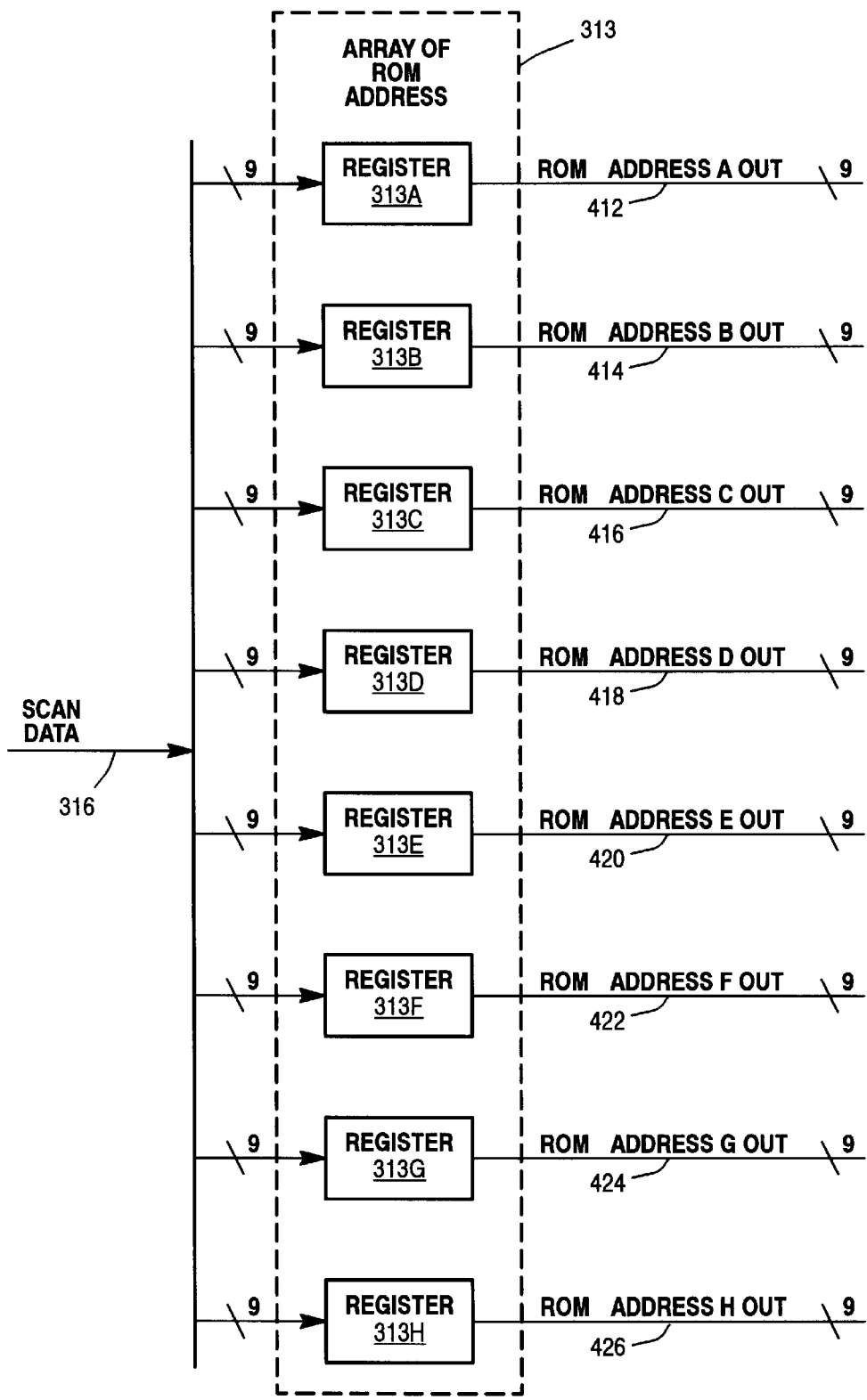
FIG. 7 is a block diagram that shows the Array of ROM Addresses.

FIG. 7 is a block diagram that shows the Array of ROM Addresses 313. The array consists of eight registers, designated as 313A–H and each available to store an address of ROM 302. Addresses are scanned in to the registers via scan Line 316. Each ROM address consists of nine bits. Outputs from the respective Registers 313A–H are made available on Lines 412, 414, 416, 418, 420, 422, 424, and 426.

Figure 8:
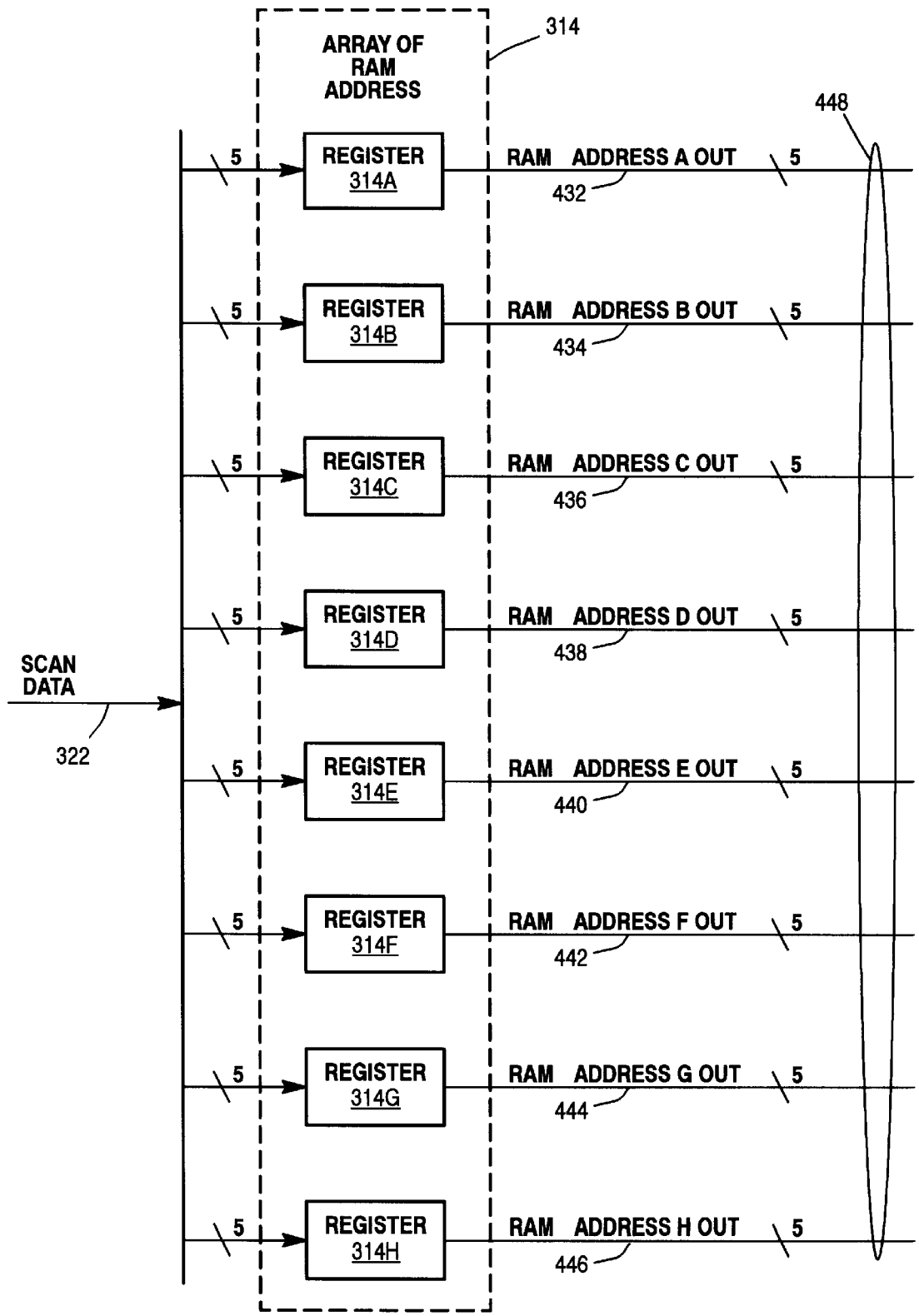
FIG. 8 is a block diagram that shows the Array of RAM Addresses.

FIG. 8 is a block diagram that shows the Array of RAM Addresses 314. The array consists of eight registers, designated as 314A–H and each available to store an address of RAM 304. Addresses are scanned in to the registers via scan Line 322. Each RAM address consists of five bits. Outputs from the respective Registers 314A–H are made available on Lines 432, 434, 436, 438, 440, 442, 444, and 446. The outputs from the Registers 314A–314H are collectively referenced as 448.

Figure 9A:
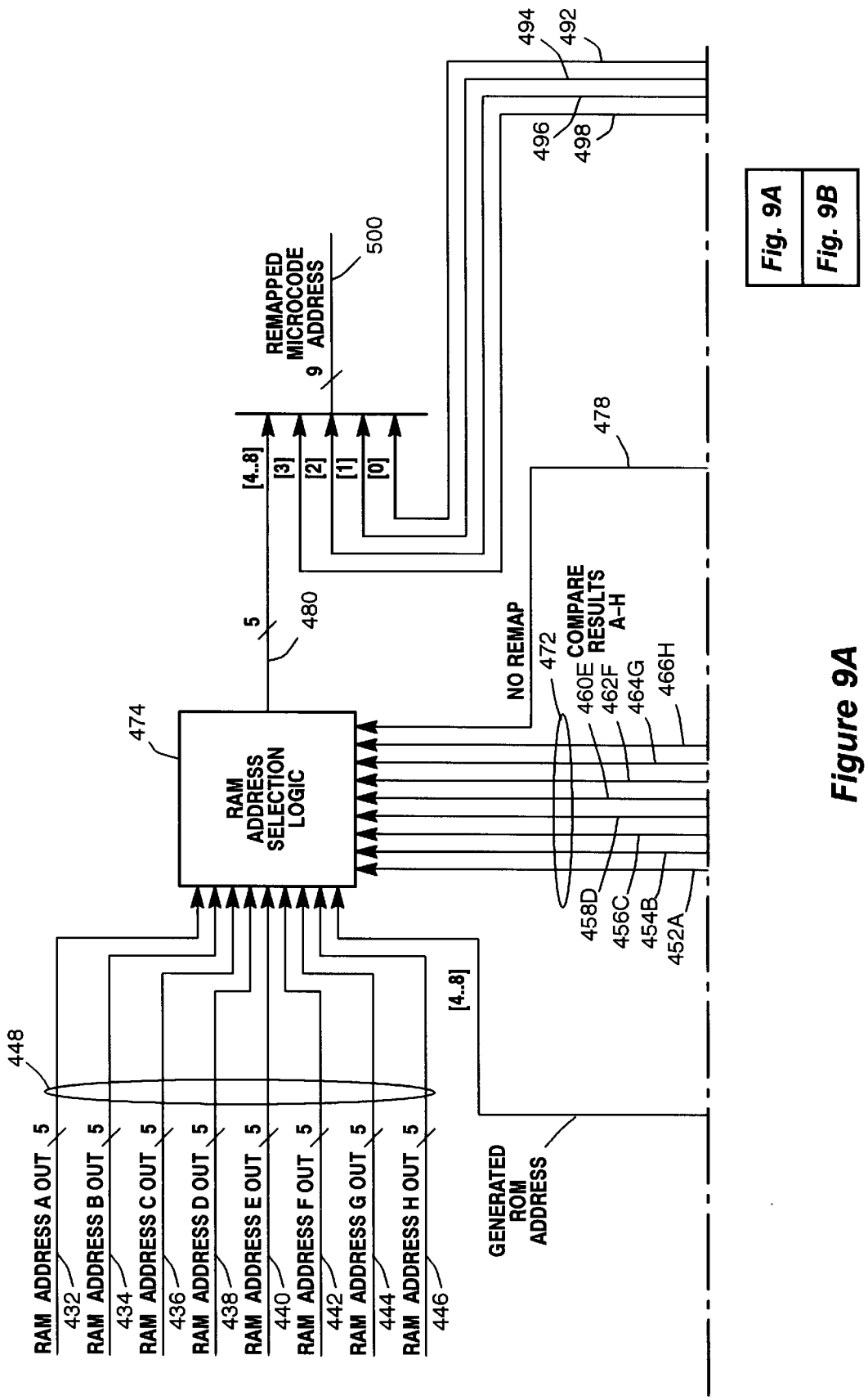
FIG. 9 shows the relationship between FIGS. 9A and 9B, which when combined contain a block diagram of the logic circuitry for remapping an address of ROM to an address of RAM.
Figure 9B:
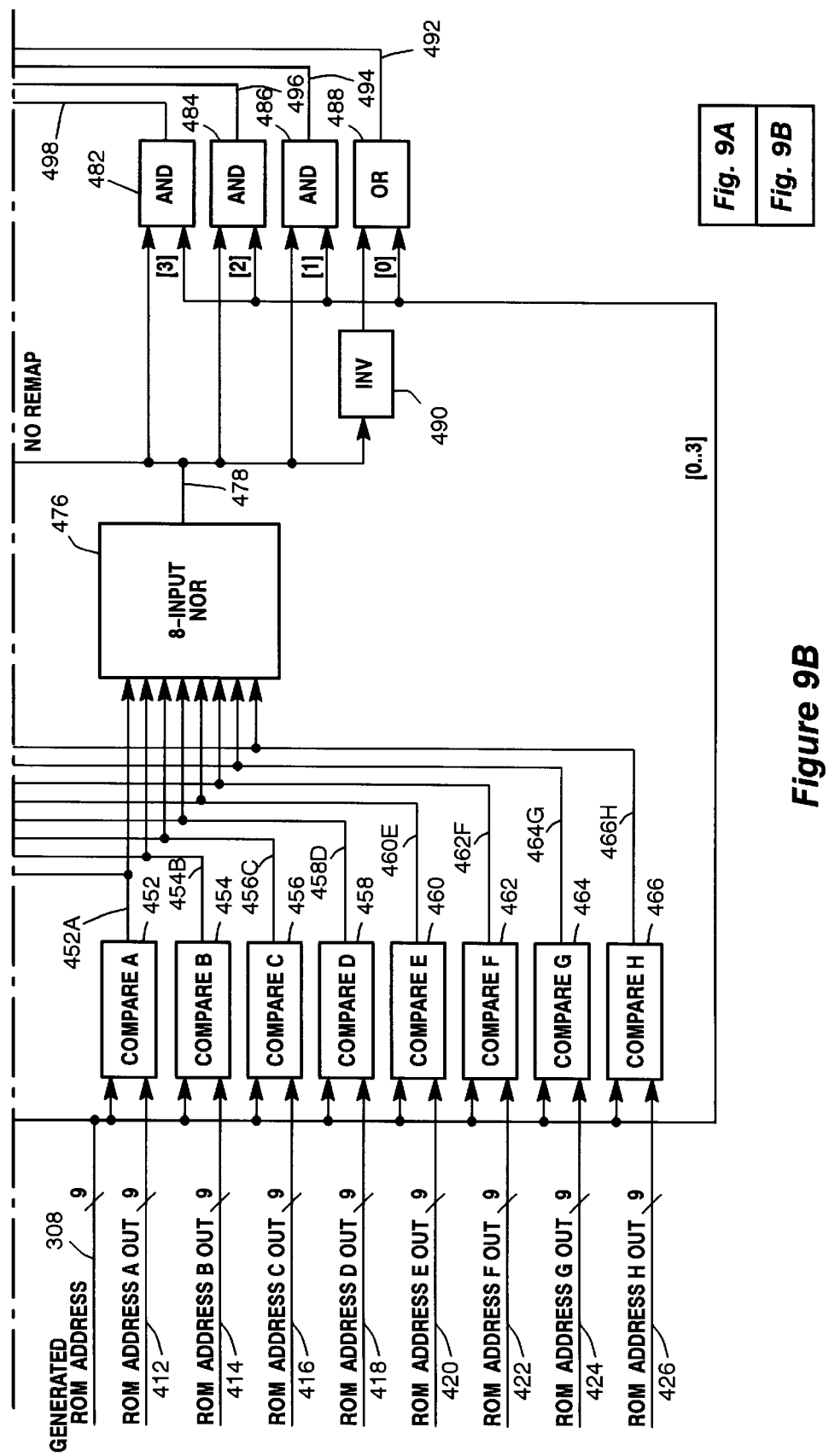

FIG. 9 shows the relationship between FIGS. 9A and 9B, which when combined contain a block diagram of the logic circuitry for remapping an address of ROM 302 to an address of RAM 304. The logic of FIGS. 9A and 9B compares the generated ROM address available on Line 308 to the ROM addresses stored in the Array of ROM Addresses 313, remaps the generated ROM address to a RAM address if the generated ROM address is present in the Array of ROM Addresses, and outputs an address for addressing either the ROM 302 or the RAM 304.

Compare Logic circuits 452, 454, 456, 458, 460, 462, 464, and 466 respectively compare the generated ROM address available on Line 308 to the contents of each of the ROM addresses the Registers 313A–313H. The signals for results of the comparisons are respectively output on Lines 452A, 454B, 456C, 458D, 460E, 462F, 464G, and 466H. The results of the comparisons are collectively referenced as 472 and input to both the RAM Address Selection Logic circuit 474 and to the 8-input NOR circuit 476. If the generated ROM address on Line 308 is not present in any Registers 313A–313H signal on Line 478 is activated and routed to the RAM Address Selection Logic 474 to indicate that no remapping is required.

If the generated ROM address on Line 308 is present in one of the Registers 313A–314H, the RAM Address Selection Logic replaces bits [4..8] of the generated ROM address with the five bits from the corresponding one of the Registers 314A–314H. Five address bits are output from the RAM Address Selection Logic. The five bits are either bits [4..8] of the generated ROM address or the five bits from one of the Registers 314A–314H.

Bits [0..3] of the generated ROM address of Line 308 are respectively routed to AND gates 482, 484, 486, and OR gate 488. The AND gates also receive as input the output on Line 478 from the 8-input NOR circuit 476, and the OR gate receives the output from the 8-input NOR circuit as routed through Inverter 490. Bit 0 controls the selection between data read from the ROM 302 and data read from the RAM 304. Bits [0..3] are respectively routed via Lines 492, 494, 496, and 498 to be combined with bits [4..8] into the Remapped Microcode Address on Line 500. As shown in FIG. 3, bits [1..11] of the Remapped Microcode Address are routed to the ROM 302, bits [4..11] are routed to the RAM 304, and bit [0] is routed to the Selector 340.

Figure 10:
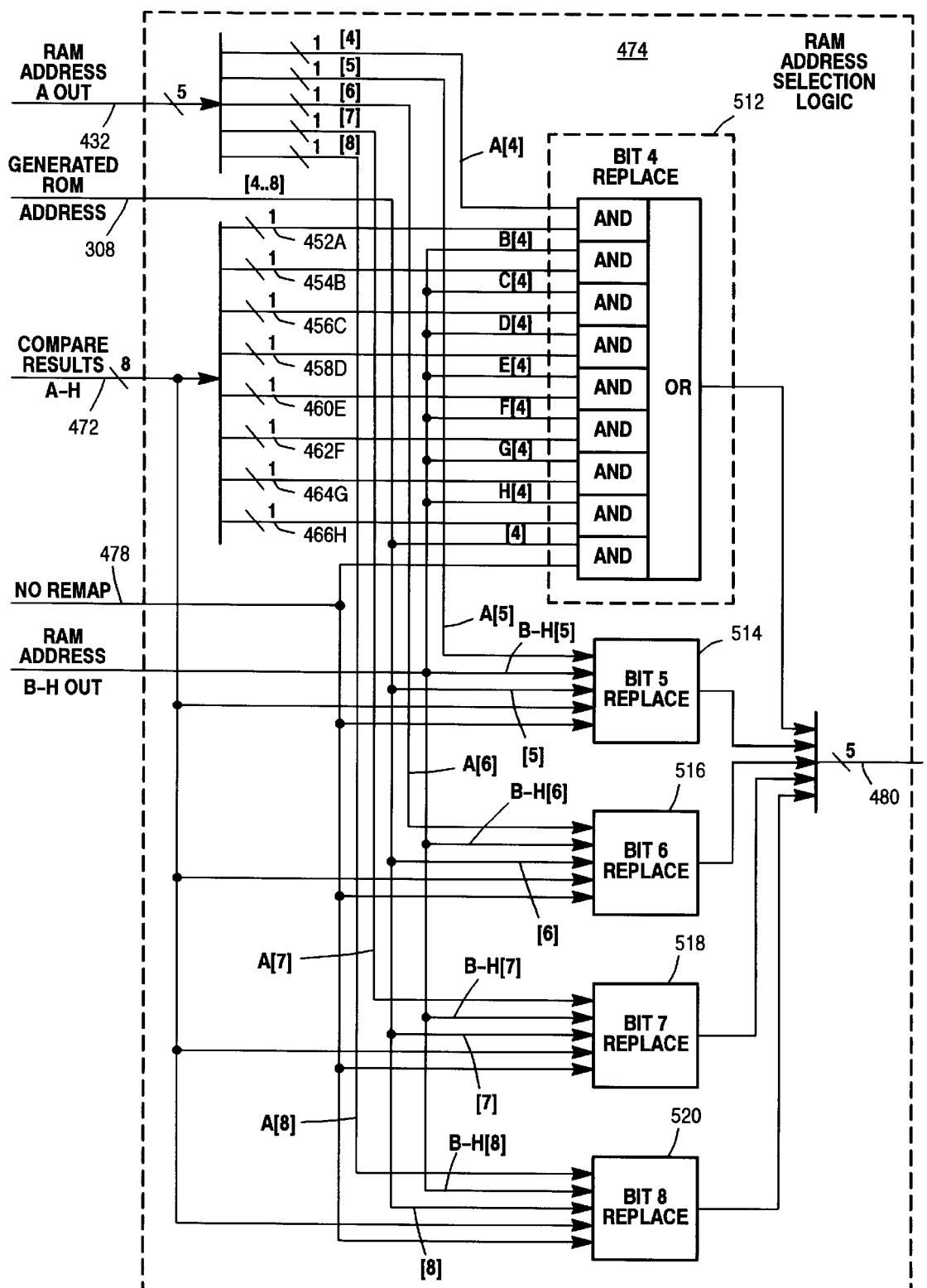
FIG. 10 is a block diagram of the logic comprising the RAM Address Selection Logic.

FIG. 10 is a block diagram of the logic comprising the RAM Address Selection Logic 474. The logic remaps a ROM address to the appropriate RAM address if the generated ROM address compared positively to any of the addresses from the Registers 313A–313H, Bits [4..8] of the generated ROM address are input on Line 308, and the results the comparisons by Compare circuits 452–466 are collectively referenced and input as Line 472.

The RAM Address Selection Logic is comprised of a Bit-4 Replace logic circuit 512, a Bit-5 Replace logic circuit 514, Bit-6 Replace logic circuit 516, Bit-7 Replace logic circuit 518, Bit-8 Replace logic circuit 520. Each of the logic circuits 512–520 replaces the respective address bit as necessary. The logic circuits 512–520 are identical in that each includes 9 AND gates with outputs coupled to an OR gate. The output of the OR gate provides the respective address bit.

One input to each of eight of the AND gates of the Bit-4 Replace logic circuit 512 is bit [4] from each of the respective Registers 314A–314H (shown as A[4] through H[4]). The other input to each of the respective AND gates is the result from a respective one of the Compare circuits 452–466, such that the output of Compare circuit 452 is compared to bit [4] of Register 314A, the output of Compare circuit 454 is compared to bit [4] of Register 314B, the output of Compare circuit 456 is compared to bit [4] of Register 314C, etc. The remaining AND gate compares bit [4] of the generated ROM address from Line 308 to the No-remap signal on Line 478.

The remaining bit replacement logic circuits (514–520) function analogously to Bit-4 Replace logic circuit 512. Bit-5 Replace logic circuit 514 receives as inputs: bit [5] of Register 314A, bit [5] of Registers 314B–314H (designated as B-H[5]), bit [5] from the generated ROM address of Line 308, the outputs from the Compare circuits 452–466, and the No-remap signal of Line 478. Bit-6 Replace logic circuit 516 receives as inputs: bit [6] of Register 314A, bit [6] of Registers 314B–314H (designated as B-H[6]), bit [6] from the generated ROM address of Line 308, the outputs from the Compare circuits 452–466, and the No-remap signal of Line 478. Bit-7 Replace logic circuit 518 receives as inputs: bit [7] of Register 314A, bit [7] of Registers 314B–314H (designated as B-H[7]), bit [7] from the generated ROM address of Line 308, the outputs from the Compare circuits 452–466, and the No-remap signal of Line 478. Bit-8 Replace logic circuit 520 receives as inputs: bit [8] of Register 314A, bit [8] of Registers 314B–314H (designated as B-H[8]), bit [8] from the generated ROM address of Line 308, the outputs from the Compare circuits 452–466, and the No-remap signal of Line 478.

We claim:

1. For use in an instruction processor for receiving and processing programmable machine instruction signals, the instruction processor having a control logic circuit to execute microcode signals to control processing of the programmable machine instruction signals, and further having a storage apparatus to store the microcode signals, the storage apparatus, comprising:

a read-only memory to store a first predetermined portion of the microcode signals;

a control store random access memory to store a second predetermined portion of the microcode signals;

a storage device to store predetermined addresses, each of said predetermined addresses being capable of addressing said read-only memory and said control store random access memory, said storage device further to store programmable selector bits, each of said programmable selector bits respectively associated with one of said predetermined addresses and indicative of whether said respectively associated one of said predetermined addresses references said read-only memory or said control store random access memory, said storage device to receive as a device address selected ones of the programmable machine instruction signals and in response thereto, to retrieve a first selected one of said predetermined addresses, whereby said first selected one of said predetermined addresses may be provided to said read-only memory and to said control store random access memory; and a selector logic circuit coupled to receive microcode read from said first selected one of said predetermined addresses within said read-only memory and further coupled to receive microcode read from said first selected one of said predetermined addresses within said control store random access memory, said selector logic circuit further coupled to said storage device to receive a programmable selector bit associated with said first selected one of said predetermined addresses, said selector logic circuit being coupled to the control logic circuit, whereby said programmable selector bit associated with said first selected one of said predetermined addresses selects either said microcode read from said read-only memory or said microcode read from said control store random access memory, wherein said selected microcode is to be provided to the control logic circuit.

2. The apparatus of claim 1, further comprising:

an address storage array to store second selected ones of said predetermined addresses and to further store an associated replacement address for each of said second selected ones of said predetermined addresses;

a remapping logic circuit coupled to said storage device to receive said first selected one of said predetermined addresses, and coupled to said address storage array to receive each of said second selected ones of said predetermined addresses and each of said associated replacement addresses, said remapping logic circuit further to select as a remapped address any one of said second selected ones of said predetermined addresses having a predetermined relationship with said first selected one of said predetermined addresses, and said remapping logic circuit having output address signal lines coupled to said read-only memory and coupled to said control store random access memory, whereby said remapping logic circuit causes the associated replacement address for said remapped address to be provided to said read-only memory and to said control store random access memory in place of said first selected one of said predetermined addresses, and whereby said remapping logic circuit causes said first selected one of said predetermined addresses to be provided to said read-only memory and to said control store random access memory if none of said second selected ones of said predetermined addresses have said predetermined relationship with said first selected one of said predetermined addresses.

3. An apparatus for storage of microcode that is associated with programmable machine instruction signals of a data processing system, the data processing system including an instruction processor for executing the machine instruction signals, and the instruction processor including a control logic circuit that utilizes the microcode for controlling execution of the machine instruction signals, the apparatus comprising:

read-only memory means for storing a first predetermined portion of the microcode;

control store random access memory means for storing a second predetermined portion of the microcode;

address random access memory means for storing predetermined addresses, each of said predetermined addresses being capable of addressing said read-only memory means and said control store random access memory means, said address random access memory means further for storing selector bits, each of said selector bits being associated with a different one of said predetermined addresses, and each for selecting either said read-only memory means or said control store random access memory means, said address random access memory means further for receiving the instruction signals and for using the instruction signals to retrieve one of said predetermined addresses, whereby said one of said predetermined addresses is provided to said read-only memory means and to said control store random access memory means for reading a first addressed portion of the microcode from said read-only memory means and for reading a second addressed portion of the microcode from said control store random access memory means, respectively;

selector logic means coupled to said read-only memory means for receiving microcode read from said read-only memory means, said selector logic further being coupled to said control store random access memory means for receiving microcode read from said control store random access memory means, said selector logic means further being coupled to said address random access memory means for receiving a selector bit associated with said one of said predetermined addresses, said selector logic means further having output means coupled to the control logic circuit for providing said first addressed portion of the microcode to the control logic circuit if said received selector bit selects said read-only memory means, and for providing said second addressed portion of the microcode to the control logic circuit if said received selector bit selects said control store random access memory means.

4. The apparatus of claim 3, further comprising:

address storage means for storing selected ones of said predetermined addresses and for further storing an associated replacement address for each of said selected ones of said predetermined addresses;

remapping logic means coupled to said address random access memory means for receiving said one of said predetermined addresses, and coupled to said address storage means for receiving each of said selected ones of said predetermined addresses and each of said associated replacement addresses, said remapping logic means further for selecting any one of said selected ones of said predetermined addresses that has a predetermined relationship with said one of said predetermined addresses, said remapping logic means further having output address signal means coupled to said read-only memory means and coupled to said control store random access memory means for causing said associated replacement address for said any one of said selected ones of said predetermined addresses to be provided to said read-only memory means and said control store random access memory means in substitution for said one of said predetermined addresses, said output address signal means further for providing said one of said predetermined addresses to said read-only memory means and to said control store random access memory means if none of said selected ones of said predetermined addresses has said predetermined relationship with said one of said predetermined addresses.

5. An apparatus for allowing a microprocessor to operate with data in a read-only memory which has been patched with data in a random access memory, wherein the microprocessor includes a control logic circuit for providing a generated read-only memory address, the apparatus comprising:

an address storage array having predetermined read-only memory addresses to address the read-only memory, and respectively associated random access memory addresses to address the random access memory;

a read-only memory embedded in the microprocessor and having an input address port and an output data port directly coupled to the control logic circuit;

a random access memory embedded in the microprocessor and having an input address port and an output data port directly coupled to the control logic circuit; and a remapping logic circuit directly coupled to the control logic circuit for receiving the generated read-only memory address, and directly coupled to said address storage array for receiving said predetermined read-only memory addresses and said respectively associated random access memory addresses, and having output address signal lines directly coupled to said input address port of said read-only memory and directly coupled to said input address port of said random access memory, whereby a respective one of said predetermined random access memory addresses is made available on said output address signal lines as a substitute address if the generated read-only memory address has a predetermined relationship to any one of said predetermined read-only memory addresses, and whereby the generated read-only memory address is made available on said output address signal lines if none of said predetermined read-only memory addresses has a predetermined relationship to the generated read-only memory address.

6. The apparatus of claim 5, wherein the generated read-only memory address is comprised of a first subset of bits and a second subset of bits, the first subset of bits being generated in a first time interval and the second subset of bits being generated in a second time interval which occurs after the first time interval, and wherein, said remapping logic circuit receives only the first subset of bits;

said read-only memory is directly coupled to said control logic circuit for receiving the second subset of bits of the generated read-only memory address;

said random access memory is directly coupled to said control logic circuit for receiving the second subset of bits of the generated read-only memory address; and whereby the remapping logic circuit substitutes said substitute address for the first subset of bits of the generated read-only memory address if the first subset of bits of the generated read-only memory address has a predetermined relationship to any one of said predetermined read only memory addresses, and whereby substitution of said substitute address occurs in parallel with generation of the second subset of bits.

7. The apparatus of claim 6, further comprising a selector having a first input, a second input, and a control input, said first input being coupled to said output data port of said read only memory, and said second input being coupled to said output data port of said random access memory;

wherein said remapping logic circuit has a control signal output coupled to said control input of said selector capable of selecting either data from said read-only memory or data from said random access memory.

8. An apparatus for allowing a microprocessor to operate with data in a read-only memory which has been patched with data in a random access memory, wherein the microprocessor includes a control logic circuit for providing a generated read-only memory address, the apparatus comprising:

a read-only memory embedded in the microprocessor and having an input address port and an output data port directly coupled to the control logic circuit;

a random access memory embedded in the microprocessor and having an input address port and an output data port directly coupled to the control logic circuit;

a first set of registers embedded in the microprocessor capable of storing predetermined addresses of said read-only memory, whereby said predetermined addresses of said read-only memory are designated as remapped to said random access memory;

a second set of registers embedded in the microprocessor, each respectively associated with one of said first set of registers and capable of storing predetermined addresses of said random access memory, whereby said predetermined addresses of said random access memory specify addresses in said random access memory to which said predetermined address of said read-only memory have been remapped; and a remapping logic circuit directly coupled to the control logic circuit for receiving the generated read-only memory address, said remapping logic circuit being coupled to said first set of registers for receiving said predetermined addresses of said read-only memory, said remapping logic circuit being coupled to said second set of registers for receiving said predetermined addresses of said random access memory, and having output address signal lines directly coupled to said input address port of said read-only memory and directly coupled to said input address port of said random access memory, whereby the generated read-only memory address is remappable to one of said predetermined addresses of said random access memory.

9. The apparatus of claim 8, wherein the generated read-only memory address is comprised of a first subset of bits and a second subset of bits, the first subset of bits being generated in a first time interval and the second subset of bits being generated in a second time interval which is after the first time interval, wherein, said remapping logic circuit receives only the first subset of bits;

said read-only memory is directly coupled to the control logic circuit for receiving the second subset of bits of the generated read-only memory address; and said random access memory is directly coupled to the control logic circuit for receiving the second subset of bits of the generated read-only memory address;

whereby the first subset of bits is remappable by said remapping logic circuit in parallel with generation of the second subset of bits.

10. The apparatus of claim 9, further comprising a selector having a first input coupled to said output data port of said read only memory, said selector having a second input coupled to said output data port of said random access memory, and said selector having a control input;

wherein said remapping logic circuit has a control signal output coupled to said control input of said selector capable of selecting either data from said read-only memory or data from said random access memory.

11. A data processing system, comprising:
a memory subsystem capable of storing machine instructions;
an instruction processor coupled to the memory subsystem capable of executing said machine instructions, said instruction processor comprising,
an embedded read-only memory having predetermined, stored micro-instructions for controlling execution of said machine instructions and an input address port and an output data port;
a control logic circuit directly coupled to said input address port and said output data port of said read-only memory and capable of generating a read-only memory address for accessing said micro-instructions;
an embedded random access memory having predetermined, stored micro-instructions that replace predetermined ones of said micro-instructions stored in said read-only memory, and having an input address port and an output data port, said output data port being directly coupled to the control logic circuit;
a first set of registers having predetermined addresses of said read-only memory, whereby said predetermined addresses of said read-only memory are designated as remapped to said random access memory;
a second set of registers, each respectively associated with one of said first set of registers and having predetermined addresses of said random access memory, whereby said predetermined addresses of said random access memory specify addresses in said random access memory to which said predetermined address of said read-only memory have been remapped; and
a remapping logic circuit directly coupled to the control logic circuit for receiving said generated read-only memory address, coupled to said first set of registers for receiving said predetermined addresses of said read-only memory, coupled to said second set of registers for receiving said predetermined addresses of said random access memory, said remapping logic circuit further having output address signal lines directly coupled to said input address port of said read-only memory and directly coupled to said input address port of said random access memory, said remapping logic circuit to remap said generated read-only memory address to one of said predetermined addresses of said random access memory which is respectively associated with any one of said predetermined addresses of said read-only memory having a predetermined relationship to said generated read-only memory address.

12. The apparatus of claim 11, wherein
said generated read-only memory address is comprised of a first subset of bits and a second subset of bits, said first subset of bits being generated in a first time interval and said second subset of bits being generated in a second time interval which is after the first time interval;
said remapping logic circuit receives only said first subset of bits;
said read-only memory is directly coupled to said control logic circuit for receiving said second subset of bits; and
said random access memory is directly coupled to said control logic circuit for receiving said second subset of bits of the generated read-only memory address;
whereby said first subset of bits is remappable by said remapping logic circuit in parallel with generation of said second subset of bits.

13. The apparatus of claim 12, further comprising a selector having a first input coupled to said output data port of said read only memory, a second input coupled to said output data port of said random access memory, and a control input;
wherein said remapping logic circuit has a control signal output coupled to said control input of said selector capable of selecting either data from said read-only memory or data from said random access memory.

14. A memory system for storing data signals and for receiving address signals to retrieve addresses ones of the stored data signals, the memory system, comprising:
first storage means for storing a first number of first groups of address-compare signals, and a second number of second groups of address re-map signals, wherein each of said first number of first groups of address-compare signals is associated with one of said second number of second groups of address re-map signals;
address re-mapping means for receiving ones of the address signals, said address re-mapping circuit further coupled to said first storage means for receiving each of said first number of first groups of address-compare signals and each of said second number of second groups of address re-map signals, said address re-mapping means for determining whether any of said first number of first sets of data signals has a predetermined relationship to said ones of the address signals;
second storage means to store data signals, said second storage means coupled to said address re-mapping means, and if said address re-mapping means determined that any one of said first number of first groups of address-compare signals has a predetermined relationship with said ones of the address signals, said second storage means for receiving from said address re-mapping means as re-mapped address signals said associated one of said second number of second groups of address re-map signals associated with said any one of said first number of first groups of address-compare signals, and if said address re-mapping means determined that none of said first number of first groups of address-compare signals has a predetermined relationship with said ones of the address signals, then said second storage means for receiving from said address re-mapping means as said re-mapped address signals said ones of said address signals, said second storage means to use said re-mapped address signals as a portion of an address to reference said second storage means.

15. The memory system of claim 14, wherein said address re-mapping means includes circuits for generating a re-map signal indicative of whether any of said first number of first sets of data signals has a predetermined relationship to said ones of the address signals, and wherein said second storage means further comprises:
read-only memory means for storing read-only data signals, said read-only memory means being coupled to said address re-mapping means for receiving said re-mapped address signals for use as a read-only memory means address, and in response thereto, for retrieving ones of said read-only data signals from said read-only memory means address;
random-access memory means for storing random-access data signals, said random-access memory means being coupled to said address re-mapping means for receiving said re-mapped address signals for use as a random-access memory means address and in response thereto, for retrieving ones of said random-access data signals from said random-access memory means address; and selector means coupled to said read-only memory means for receiving said read-only data signals, further coupled to said random-access memory means for receiving said random-access data signals, and coupled to said address re-mapping means for receiving said re-map signal, said selector means for selecting said read-only data signals as the addressed data signals when said re-map signal indicates that one of said first number of first groups of address-compare signals has a predetermined relationship with said ones of said address signals, and for selecting said random-access data signals as the addressed data signals when said re-map signal indicates that none of said first number of first groups of address-compare signals has a predetermined relationship with said ones of said address signals.

16. The memory system of claim 15, wherein said random-access memory means includes first receiving means for receiving a first sub-set of the address signals to be used in conjunction with said re-mapped address signals for use as said random-access memory means address.

17. The memory system of claim 16, wherein said read-only memory means includes second receiving means for receiving a second sub-set of the address signals to be used in conjunction with said re-mapped address signals for use as said read-only memory means address.

18. The memory system of claim 17, and further including control logic means for receiving the address signals and for performing a predetermined logical function on a sub-set of the address signals to thereby generate a processed sub-set of the address signals, said processed sub-set of the address signals not including any of said ones of the address signals which are received by said address re-mapping means, said predetermined logical function being performed in parallel with the generation of said re-mapped address signals by said address re-mapping means, said control logic means being coupled to said read-only memory means and to said random-access memory means for providing said processed sub-set of the address signals to said read-only memory means and to said random-access memory means, respectively, to be included in said first sub-set of address signals and said second sub-set of address signals, respectively, said processed sub-set of the address signals being provided in parallel with said address re-mapping means providing said re-mapped address signals.

19. A memory system being addressed by a predetermined set of address signals, for storing data signals, and for providing retrieved ones of the stored data signals during a memory system read operation, the memory system comprising:

an input port to receive the predetermined set of address signals;

a first storage device to store multiple first sets of data signals;

a second storage device to store multiple second sets of data signals, wherein each of said first sets of data signals is associated with an associated one of said second sets of data signals;

an address re-mapping circuit coupled to said input port for receiving a first sub-set of the predetermined set of address signals, said address re-mapping circuit further coupled to said first storage device to receive said multiple first sets of data signals and coupled to said second storage device to receive said multiple second sets of data signals, said address re-mapping circuit to determine whether any one of said multiple first sets of data signals is a matching set having a predetermined relationship to said first sub-set of the predetermined set of address signals, and if said matching set is found, to substitute the one of said second sets of data signals associated with said matching set in place of said first sub-set of the predetermined set of address signals to thereby create a re-mapped one of said first sub-set of the predetermined set of address signals, and if said matching set is not found, to provide said first sub-set of the predetermined set of address signals as said re-mapped one of said first sub-set of the predetermined set of address signals, said address re-mapping circuit further to provide a re-mapping signal indicative of whether said matching set was found;

a read-only storage device coupled to said input port to receive a second sub-set of the predetermined set of address signals, said read-only memory further coupled to said address re-mapping circuit to receive said re-mapped one of said first sub-set of the predetermined set of address signals, and to use said second sub-set of the predetermined set of address signals in conjunction with said re-mapped one of said first sub-set of the predetermined set of address signals as an address to thereby retrieve read-only data signals from said read-only storage device;

a random-access storage device coupled to said input port to receive a third sub-set of the predetermined set of address signals, said random-access storage device further coupled to said address re-mapping circuit to receive said re-mapped one of said first sub-set of the predetermined set of address signals, and to use said third sub-set of the predetermined set of address signals in conjunction with said re-mapped one of said first sub-set of the predetermined set of address signals as an address to thereby retrieve random-access data signals from said random-access storage device; and a selector coupled to said read-only storage device to receive said read-only data signals, and coupled to said random-access storage device to receive said random-access data signals, said selector further coupled to said address re-mapping circuit to receive said re-mapping signals and to thereby select said read-only data signals as the retrieved ones of the stored data signals if said matching set was not found, and to select said random-access data signals as the retrieved ones of the stored data signals if said matching set was found.

20. The memory system of claim 19, and further including a control logic circuit coupled to said read-only storage device and further coupled to said random-access storage device, said control logic circuit to perform predetermined logical functions on said second sub-set and said third sub-set of the predetermined set of address signals in parallel with said address re-mapping circuit creating said re-mapped one of said first sub-set of the predetermined set of address signals.

* * * * *